United States Patent [19]

Al-Ekabi et al.

[11] Patent Number: 5,126,111
[45] Date of Patent: Jun. 30, 1992

[54] FLUID PURIFICATION

[75] Inventors: Hussain Al-Ekabi; Robert B. Henderson, both of London, Canada

[73] Assignee: Nutech Energy Systems Inc., London, Canada

[21] Appl. No.: 702,518

[22] Filed: May 20, 1991

Related U.S. Application Data

[63] Continuation-in-part of Ser. No. 625,921, Dec. 5, 1990.

[51] Int. Cl.⁵ .............................. B01J 19/12
[52] U.S. Cl. .................... 422/186.3; 422/186; 210/748; 210/763; 204/157.15; 204/157.44
[58] Field of Search ............ 422/186, 186.04, 186.07, 422/186.3, 905; 210/748, 763; 204/157.15, 157.44

[56] References Cited

U.S. PATENT DOCUMENTS

| | | | |
|---|---|---|---|
| 3,067,115 | 1/1962 | Clingman | 422/186.3 |
| 4,277,438 | 7/1981 | Ejzak | 422/80 |
| 4,512,900 | 4/1985 | Macur et al. | 210/748 |
| 4,694,179 | 9/1987 | Lew et al. | 250/431 |
| 4,849,114 | 7/1989 | Zeff et al. | 210/747 |
| 4,861,484 | 8/1989 | Lichtin et al. | 210/638 |
| 4,892,712 | 1/1990 | Robertson et al. | 422/186 |

OTHER PUBLICATIONS

The Encyclopedia of Chemical Process Mead, William J., Equipment, pp. 686-694.
Tanaka et al., New Journal of Chemistry (NJOC) vol. 13, No. 1, 1989 Photocatalytic Degradation of Organohalide Compounds in Semiconductor Suspension with Added Hydrogan Proxide,
Tanka et al., Journal of Photochemistry and Photobiology A: (JOPP), Chemistry 45 (1989), pp. 155-159.

Primary Examiner—Brooks H. Hunt
Assistant Examiner—Daniel J. Jenkins

[57] ABSTRACT

A method of removing, reducing or detoxifying organic pollutants from a fluid, water or air, by contacting the fluid with a photoreactive metal semiconductor material in the presence of ultraviolet light of a wavelength to activate the photoreactive material, is improved by simultaneously contacting the photoreactive material with a substance that accepts electrons and thus inhibits hole-electron recombination. Such substance will be such as to readily accept electrons either from the conduction band or from superoxide ions, and to rapidly dissociate into harmless products.

20 Claims, 3 Drawing Sheets

FLUID PURIFICATION

This application is a continuation-in-part of application Ser. No. 07/625,921 filed Dec. 5, 1990.

FIELD OF THE INVENTION

The invention relates to the purification of a fluid, for example water or air, and more particularly to the removal, reduction or detoxification from water or air of organic pollutants, such as polychlorobiphenyls (PCB's), trihalomethanes, benzene derivatives, pesticides and others, some of which are mentioned below.

BACKGROUND OF THE INVENTION

Conventional pollution treatment technologies, such as carbon adsorption, air stripping and bio-oxidation, are effective in removing many organic pollutants from water streams, but they exhibit a major drawback. Both carbon adsorption and air stripping merely transfer the organic pollutants from one medium to the other. Biological treatment, on the other hand, is relatively slow and inefficient in removing many man-made organic pollutants such as chlorinated hydrocarbons. An efficient technology is required, which will not only remove the organic pollutants from the water streams, but also destroy them.

Among advanced photo-oxidation processes, the $TiO_2$ photocatalyzed removal of organic pollutants has recently begun to show considerable promise. The $TiO_2$ process is very well documented in the literature. The illumination of $TiO_2$ in water with light of wavelength <400 nm generates excess electrons in the conduction band ($e^-_{CB}$) and positive holes ($h^+_{VB}$) in the valence band.

$$TiO_2 + h\nu \rightarrow e^-_{CB} + h^+_{VB} \quad (1)$$

At the surface the holes either react with adsorbed $H_2O$ or surface $OH^-$ groups to form OH radicals.

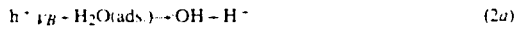

$$h^+_{VB} + H_2O(ads.) \rightarrow \cdot OH + H^+ \quad (2a)$$

$$h^+_{VB} + OH^-(sur.) \rightarrow \cdot OH \quad (2b)$$

Excess electrons in the conduction band probably react with molecular oxygen to form superoxide ions

$$e^-_{CB} + O_2 \rightarrow O_2^- \quad (3)$$

which can further disproportionate to form more OH radicals.

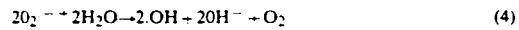

$$2O_2^- + 2H_2O \rightarrow 2\cdot OH + 2OH^- + O_2 \quad (4)$$

The OH radicals are extremely reactive and readily attack organic molecules, eventually degrading them to $CO_2$ and $H_2O$ (and halide ions when the organic molecule contains halogen atoms). Thus the advantage of this technology is that it not only removes, but also destroys organic pollutants.

PRIOR ART

U.S. Pat. No. 4,892,712 issued Jan. 9, 1990 (Canadian patent application No. 576,139 filed Aug. 31, 1988) discloses a device and method for the above purpose. More specifically, this prior patent (the contents of which are incorporated herein by reference) discloses a method of removing, reducing or detoxifying organic pollutants from a fluid, especially water, by bringing such fluid into contact with a photoreactive metal semiconductor material, preferably $TiO_2$ in its anatase crystalline form, in the presence of ultraviolet light of a wavelength to activate such material. More specifically, this patent discloses a jacket, a lamp, and a photocatalytic sleeve. The lamp emits ultraviolet light in the 300-400 nm range and is mounted coaxially within the jacket. Around the lamp lies a sleeve matrix formed of fibreglass mesh that is coated with titanium dioxide (anatase). The anatase is activated by ultraviolet light. Contaminated water flows through the reactor in parallel with the lamp. Typically, 4 L of contaminated water was circulated through the system for 15 min in the dark. At this point the light was switched on and samples were taken periodically. The samples were analyzed on a Hewlett Packard 5890A gas chromatograph using a megabore DB-5 (30 m long, 0.53 mm in diameter) with an electron capture detector operating at 300° C. and nitrogen (14 mL/min) was used as carrier gas.

The major practical problem in using $TiO_2$ as a photocatalyst is the "hole-electron" recombination process. This process is efficient and is considered to be the principal energy wasting step in the $TiO_2$ photocatalytic degradation of organic pollutants. The low quantum yield (<2%) of the $TiO_2$ photocatalytic degradation of organic compounds is indicative of the effect of the "hole-electron" recombination process.

A challenging opportunity thus exists to improve the degradation rate of organic pollutants by preventing the "hole-electron" recombination process. This is an important step prior to commercial application of the $TiO_2$ technology for water treatment.

SUMMARY OF THE INVENTION

The present invention relates to a discovery by which this removing, reducing or detoxifying process can be improved, in particular by being caused to operate more rapidly. The invention thus enables effective treatment of a larger volume of fluid per unit time for a given size of equipment.

More specifically, the inventive strategy for inhibiting the "hole-electron" recombination process is to add efficient (preferably irreversible) electron acceptors to the reaction. In order for these additives to efficiently inhibit the readily accepting electrons either from the conduction band or the superoxide ions ($O_2^-$), and rapidly dissociating into harmless products, and preferably providing a route for the formation of OH radicals or other powerful oxidizing agents.

In one aspect, the invention consists of carrying out the process in the presence of ozone. In practice, ozone is only available in the presence of oxygen, and hence this aspect of the invention consists of carrying out the process in the presence of ozonised oxygen or in the presence of air, some of the oxygen content of which has been ozonised, commonly referred to as ozonised air.

In addition, it has also been discovered that a still further increase in the speed of reaction can be achieved by carrying out the process in the presence of both ozonised oxygen (or air) and hydrogen peroxide.

The advantage of adding hydrogen peroxide alone to this reaction has been known in the art. See, for example, K. Tanaka et al "Photocatalytic Degradation of Organohalide Compounds in Semiconductor Suspension with added Hydrogen Peroxide" New J. Chem. 1989, 13,5; and K. Tanaka et al "Efficient Photocatalytic Degradation of Chloral Hydrate in Aqueous Semiconductor Suspension" Journal of Photochemistry and Photobiology, A:Chemistry 45(1989), pp. 155–159. It has now been discovered that the effect of a combination of hydrogen peroxide and ozonised oxygen or air represents a still further improvement in the speed of the process.

Yet another discovery that forms part of the present invention is that, when the invention is practised using a matrix such as disclosed in the patent mentioned above, the addition of ozone to the reaction results in a cleaning action on the matrix to which the photoreactive material is bonded. It is believed that the ozone causes flocculation of certain metal ions, such as those of iron, and, as a result, avoids leaching of such metals out of the water or other fluid being treated by the photoreactive material.

In another aspect, the invention consists of carrying out the process in the presence of persulphate ion ($S_2O_8^{2-}$), or in the presence of a combination of persulphate ion with hydrogen peroxide, or ozone, or both.

In yet other aspects, the invention consists of carrying out the process in the presence of peroxymonosulphate ion ($HSO_5^-$), bromate ion ($BrO_3^-$), chlorate ion ($ClO_3^-$), perchlorate ion ($ClO_4^-$), permanganate ion ($MnO_4^-$), ferrate ion ($FeO_4^{2-}$) peroxymonophosphate ions ($HPO_5^{2-}$ and $H_2PO_5^-$), or peroxyacetic acid ($CH_3COOOH$), either alone or in combination with hydrogen peroxide, or ozone, or both.

BRIEF DESCRIPTION OF THE DRAWING

The accompanying drawings show diagrammatically devices for carrying out processes according to preferred embodiments of the present invention.

Specifically.

DETAILED DESCRIPTION OF THE PREFERRED EMBODIMENTS

Figure 1:
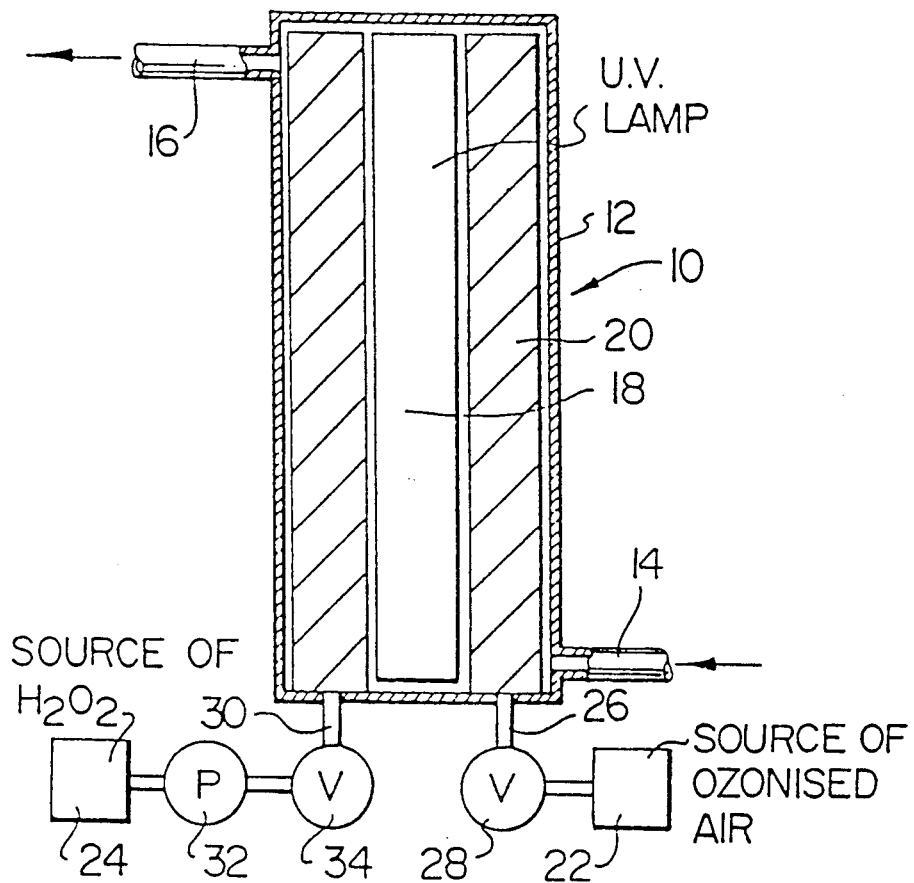
FIG. 1 shows the invention practised with a flow through reactor of the type described in the patent mentioned above.

FIG. 1 shows a reactor 10 consisting of a jacket 12 having an inlet 14 for water containing undesirable pollutants, especially halogenated organic materials, and an outlet 16 for purified water. The jacket contains an axially extending cylindrical lamp 18 for generating ultraviolet light of wavelengths in the range of 300 to 425 nm, preferably peaking in the range of 340 to 360 nm.

Between the lamp 18 and the jacket 12 there is a matrix 20 that has been illustrated diagrammatically but in practice will preferably take the form of a number of cylindrical layers of fibreglass mesh, onto or into which anatase or other photoreactive metal semiconductor material has been bonded. As will be apparent, a stream of water flowing from the inlet 14 to the outlet 16 will come into intimate contact with the photoreactive material while being exposed to the ultraviolet light. The natural porosity of the mesh will both enable the flow of liquid therethrough to improve the intimacy of contact, and, combined with the transparent nature of the fibreglass at the selected wavelength of light, will enable the anatase on mesh layers remote from the lamp and on mesh surfaces facing away from the lamp to nevertheless receive sufficient light to become photoreactive.

A pressurized source 22 of ozonised air and a source 24 of hydrogen peroxide are provided. The ozonised air source is connected by a conduit 26 to the interior of the jacket 12 near the inlet 14 so that on opening of a valve 28 the ozonised air can be caused to bubble through the water stream flowing through the matrix 20 in intimate contact with the photoreactive material. The hydrogen peroxide can be similarly introduced into the reaction using a conduit 30, pump 32 and valve 34.

Figure 2:
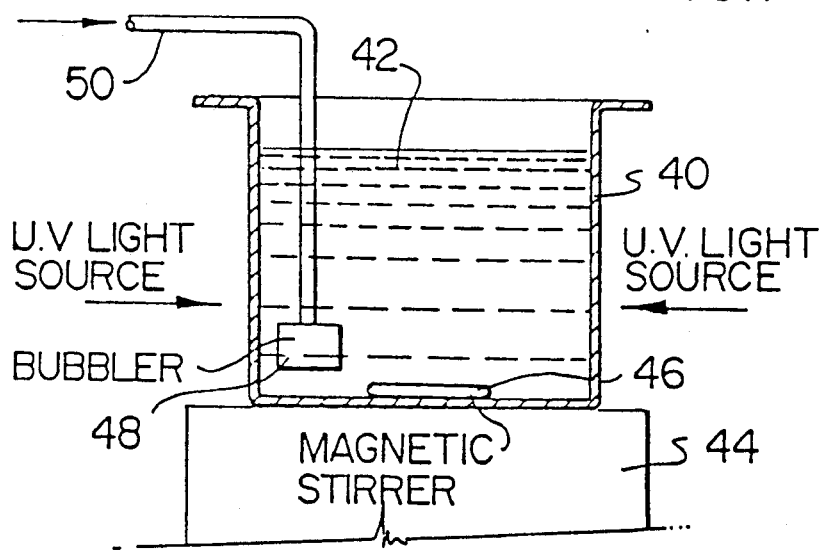
FIG. 2 shows the invention practised as a batch type operation.

FIG. 2 shows a transparent vessel 40 containing a slurry 42 of a liquid containing an organic pollutant and a photoreactive semiconductor material such as $TiO_2$ in anatase form. The vessel is supported on a mount 44 that contains a conventional magnetic stirrer mechanism (not shown) for rotating a magnetic rod 46. Ultraviolet light of a wavelength as suggested above is directed from sources (not shown) through the vessel walls into the slurry 42. The process speed is enhanced by bubbling ozonised air into the slurry from a bubbler 48 supplied by a conduit 50.

Before describing the results of experiments that have been conducted, some comments on the theory of semiconductor photocatalytic processes will be provided.

One of the major practical problems associated with a semiconductor photocatalyst is the electron-hole recombination process of the photogenerated electron-hole pair. The kinetic barrier for this process is very low and the overall result of its occurrence is merely the generation of heat. The electron-hole recombination process decreases significantly the photocatalytic activity of an excited semiconductor. The quantum yield for $TiO_2$ photocatalytic degradation of some organic compounds has been reported to be about <2%. There is thus excellent opportunity for improving the degradation rate of organic pollutants by preventing the electron-hole recombination process.

Since the oxidation of hydroxyl ions and/or water adsorbed on the surface by the valence band holes to form OH. radicals appears to be responsible for the degradation of organic compounds, one way to improve the degradation rate is to add electron acceptors to the reaction. In the case of hydrogen peroxide and ozone, these additives would be consumed during the reaction leaving no need for a secondary disposal treatment. By accepting the conduction band electron, they increase the lifetime of the "hole" and faster degradation rates are achieved.

It is known that the presence of oxygen proves useful in many semiconductor photoinduced organic reactions where the photogenerated "hole" is the species driving the reaction. See V. Augugliaro et al "Photocatalytic Degradation of Phenol in Aqueous Titanium Dioxide Dispersions" Toxicological and Environmental Chemistry, Vol. 16, pp. 89-109(1988). As an electron acceptor, oxygen traps the photogenerated electron at the conduction band as a superoxide ion, $O_2^-$, thereby prolonging the lifetime of the photogenerated "hole" by delaying the collapse of the electron-hole pair.

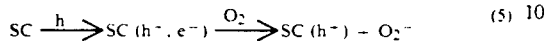  (5)

Our experiments have shown that oxygen plays a crucial role in the photocatalytic degradation of 2,4-DCP (dichlorphenol). It is not clear whether the role of oxygen is simply to accept the conduction band electron and prolong the lifetime of the "hole" (necessary for water oxidation which produces OH radicals) or whether it further participates in the overall degradation process.

As stated earlier the oxidation of hydroxyl ions and/or $H_2O$ adsorbed on the surface by the valence band "holes" to form OH. radicals appears to be responsible for the degradation of organic compounds. Therefore, one way to improve the degradation rate of 2,4-DCP is to add to the reaction an irreversible electron acceptor. Hydrogen peroxide accepts electrons either from the conduction band or superoxide ion and decomposes to hydroxyl radical and hydroxyl ion.

This will not only prolong the lifetime of the valence band "hole" but also provide an additional route for OH. radical formation. Our experiments have, indeed, found that the addition of hydrogen peroxide to the reaction mixture increases considerably the degradation rate of 2,4-DCP. Maximum effect was observed for hydrogen peroxide concentration in the range of $3 \times 10^{-3}M$ to $1.5 \times 10^{-2}M$.

We next investigated the effect of the addition of ozone on the degradation of 2,4-DCP and NB (nitrobenzene). The following Table 1 shows the results for $TiO_2$ photocatalytic degradation irradiated (except where otherwise specified) with ultraviolet light of a wavelength between 340 and 400 nm, the symbol k standing for the degradation rate constant.

TABLE 1

The degradation rate constant (k) of 2,4-DCP (10 ppm) and NB (50 ppm) under various conditions.

|  |  | k · $10^2$ min$^{-1}$ |
|---|---|---|
| 2,4-DCP (10 ppm) | no additive | 9.6 ± 0.8 |
|  | oxygen alone | 12.3 ± 0.3 |
|  | ozonised oxygen | 21.0 ± 2.0 |
|  | ozonised oxygen but without irradiation | 11.0 ± 1.0 |
| NB (50 ppm) | no additive | 1.0 ± 0.2 |
|  | oxygen alone | 4.2 ± 0.5 |
|  | ozonised oxygen | 5.0 ± 0.3 |
|  | ozonised oxygen but without irradiation | 0.6 |
|  | ozonised oxygen plus $2.9 \times 10^{-2}M\ H_2O_2$ | 9.3 ± 0.5 |

It is apparent that the combination of oxygen and ozone doubled the degradation rate of 2,4-DCP and increased by a factor of five the degradation rate of NB. The combination of oxygen, ozone and $H_2O_2$ increased by a factor of nine the degradation rate of NB. Ozone, in the dark, was effective in the degradation of 2,4-DCP. The degradation of NB by ozone in the dark was less effective. Overall, the combination of oxygen, ozone and $H_2O_2$ was very effective in the degradation of NB. It is expected that this combination will provide a similar improvement on the degradation of trichloroethylene and 1,1,2-dichloroethane as representatives of chlorinated alkenes and alkanes, respectively.

In many industrial wastes, where degradation of organic pollutants is the major concern, the addition of an inorganic anion (such as persulphate ion) to enhance the degradation rate of the organic pollutants may be justified. In homogeneous reactions the persulphate ion dissociates, on accepting an electron, to a sulphate ion and a sulphate radical ion.

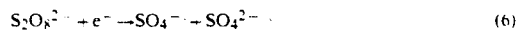  (6)

Based on this experimental fact, ammonium persulphate has been chosen as an electron acceptor in the photocatalytic degradation of organic pollutants so that, under appropriate conditions, $S_2O_8^{2-}$ can also accept an electron from the conduction band or the superoxide ion ($O_2^-$) to give $SO_4^{2-}$ and $SO_4^-$.

The sulphate radical ion is effective in two ways: (a) it can act as a precursor for OH radicals as shown in the following equation:

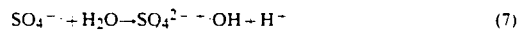  (7)

and (b) it can act as a powerful oxidizing agent for organic pollutants.

Figure 3:
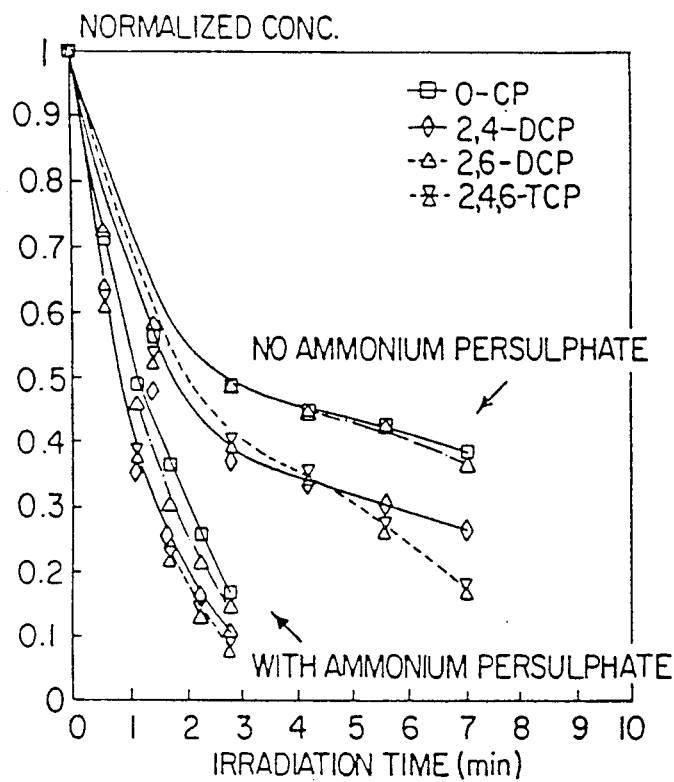
FIG. 3 is a graph illustrating the results of the disclosed method applied to the photocatalytic degradation of a mixture of o-chlorophenol, 2,4-dichlorophenol, 2,6-dichlorophenol and 2,4,6-trichlorophenol in the presence and absence of persulphate ion.
Figure 4:
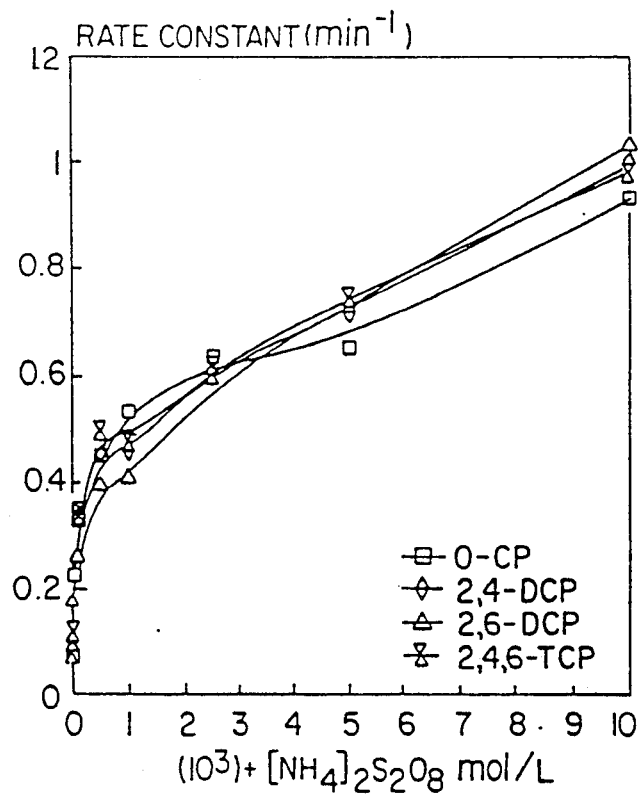
FIG. 4 is a graph illustrating the function of rate constant versus concentration of ammonium persulphate for o-chlorophenol, 2,4-dichlorophenol, 2,6-dichlorophenol and 2,4,6-trichlorophenol.

The photocatalytic degradation of a mixture of o-chlorophenol, 2,4-dichlorophenol, 2,6-dichlorophenol and 2,4,6-trichlorophenol (10 ppm each) in the presence and absence of persulphate ions has been examined. The results presented in FIG. 3 and plotted as the normalized concentration versus the irradiation time show clearly that $S_2O_8^{2-}$ markedly increased the degradation rates of the four components involved in the reaction mixture. FIG. 4 gives the rate constant versus concentration of ammonium persulphate in mol/L for the same four chlorinated phenols.

Figure 5:
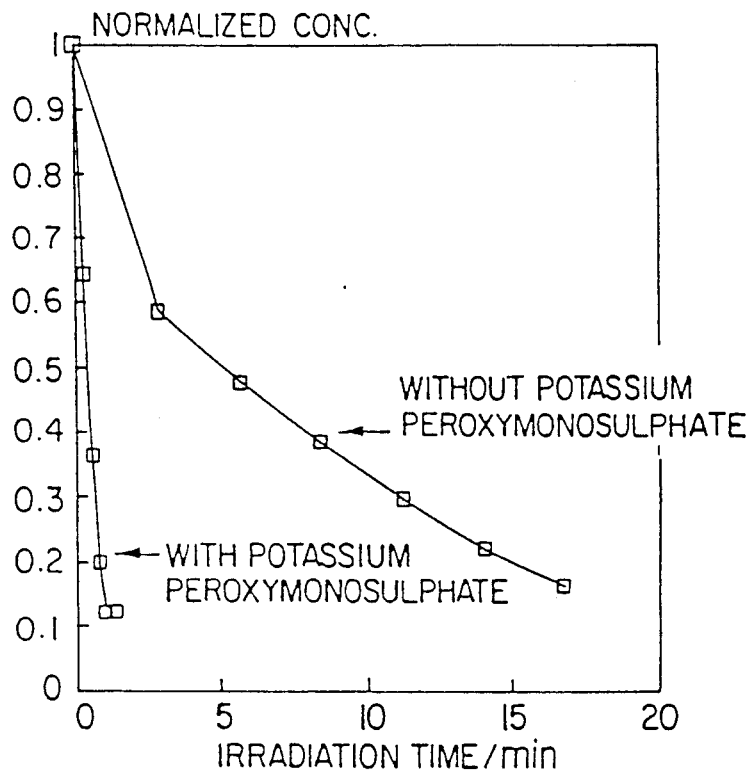
FIG. 5 is a graph illustrating the results of the disclosed method applied to the photocatalytic degradation of 2,4-dichlorophenol in the presence and absence of potassium peroxymonosulphate.

The photocatalytic degradation of 2,4- dichlorophenol (40 ppm) in the presence and absence of potassium peroxymonosulphate (oxone) has also been examined and the results are shown in FIG. 5.

Figure 6:
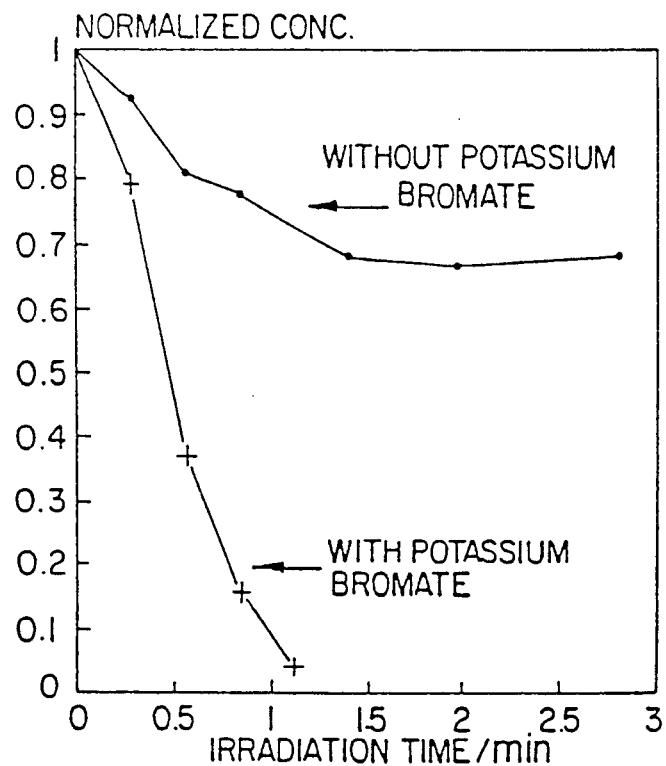
FIG. 6 is a graph illustrating the results of the disclosed method applied to the photocatalytic degradation of 2,4-dichlorophenol in the presence and absence of potassium bromate.

The photocatalytic degradation of 2,4-dichlorophenol (40 ppm) the and absence of potassium bromate has also been examined and the results are shown in FIG. 6.

FIGS. 5 and 6 thus establish the utility of peroxymonosulphate ion ($HSO_5^-$) and bromate ion ($BrO_3^-$). In addition we have no reason to believe that the other materials listed below will not work, e.g. chlorate ion ($ClO_3^-$), perchlorate ion ($ClO_4^-$), permanganate ion ($MnO_4^-$), ferrate ion ($FeO_4^{2-}$), peroxymonophosphate ions ($HPO_5^{2-}$ and $H_2PO_5^-$) and peroxyacetic acid ($CH_3COOOH$), either alone or in combination with hydrogen peroxide, or ozone, or both. In practice either a sodium, potassium or ammonium salt containing one of these ions will likely be chosen.

As FIG. 5 shows potassium peroxymonosulphate was also examined as an electron acceptor. The formula of this salt is $2KHSO_5.KHSO_4.K_2SO_4$. However, in aqueous solutions it is best written as $HSO_5^-$. It is known that, accepting an electron, $HSO_5^-$ dissociates in two different pathways:

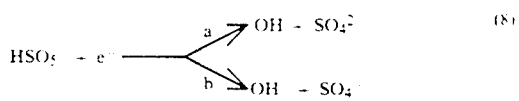

While path a provides hydroxyl radicals (OH), path b provides sulphate radical ions ($SO_4^-$) which are a powerful oxidizing agent.

We claim:

1. In a method of removing, reducing or detoxifying organic pollutants from a fluid by contacting the fluid with a photoreactive semiconductor material in the presence of ultrviolet light of a wavelength in the range of 300 to 425 nm to activate the photoreactive material, whereby to generate superoxide ions formed by electron transfer from the conducting bend of the semiconductor material to molecular oxygen to furnish electrons for recombination with holes in the semiconductor material, the improvement comprising inhibiting such recombination by simultaneously contacting the photoreactive material with ozonised oxygen or ozonised air whereby the ozone therein irreversibly accepts electrons either from the conduction band of the semiconductor material or from the superoxide ions to form ozonide ions ($O_3^-$) which upon reacting with hydrogen ions ($H^+$) generate additional hydroxyl radicals (OH) and molecular oxygen ($O_2$), said additional hydroxyl radicals enhancing the removal, reduction or detoxification of said organic pollutants.

2. A method according to claim 1, wherein the light has a wavelength in the range of 340 to 360 nm.

3. A method according to claim 1, wherein the photoreactive material is $TiO_2$.

4. A method according to claim 1, wherein the fluid is water.

5. A method according to claim 1, including simultaneously contacting the photoreactive material with at least one of hydrogen peroxide and a substance containing at least one of persulphate ions, bromate ions, chlorate ions, perchlorate ions, permanganate ions, ferrate ions, peroxymonophosphate ions or peroxyacetic acid.

6. A method according to claim 5, wherein the light has a wavelength in the range of 340 to 360 nm.

7. A method according to claim 5, wherein the fluid is water.

8. A method according to claim 5, wherein the photoreactive material is $TiO_2$.

9. In a method of removing, reducing or detoxifying organic pollutants from a fluid by contacting the fluid with a photoreactive semiconductor material in the presence of ultraviolet light of a wavelength in the range of 300 to 425 nm to activate the photoreactive material, whereby to generate superoxide ions formed by electron transfer from the conducting band of the semiconductor material to molecular oxygen to furnish electrons for recombination with holes in the semiconductor material, the improvement comprising inhibiting such recombination by simultaneously contacting the photoreactive material with persulphate ions ($S_2O_8^{2-}$) whereby the persulphate ions irreversibly accept electrons either from the conduction band of the semiconductor material or from the superoxide ions and dissociate into sulphate radical ions ($SO_4^-$) and sulphate ions, said sulphate radical ions enhancing the removal, reduction or detoxification of said organic pollutants.

10. A method according to claim 9, wherein the light has a wavelength in the range of 340 to 360 nm.

11. A method according to claim 9, wherein the fluid is water.

12. A method according to claim 9, wherein the photoreactive material is $TiO_2$.

13. In a method of removing, reducing or detoxifying organic pollutants from a fluid by contacting the fluid with a photoreactive semiconductor material in the presence of ultraviolet light of a wavelength in the range of 300 to 425 nm to activate the photoreactive material, whereby to generate superoxide ions formed by electron transfer from the conducting band of the semiconductor material to molecular oxygen to furnish electrons for recombination with holes in the semiconductor material, the improvement comprising inhibiting such recombination by simultaneously contacting the photoreactive material with peroxymonosulphate ions ($HSO_5^-$) whereby the peroxymonosulphate ions irreversibly accept electrons either from the conduction band of the semiconductor material or from the superoxide ions and dissociate to generate either additional hydroxyl radicals (OH) or sulphate radical ions ($SO_4^-$) or both, said additional hydroxyl radicals and/or sulphate radical ions enhancing the removal, reduction or detoxification of said organic pollutants.

14. A method according to claim 13, wherein the light has a wavelength in the range of 340 to 360 nm.

15. A method according to claim 13, wherein the fluid is water.

16. A method according to claim 13, wherein the photoreactive material is $TiO_2$.

17. In a method of removing, reducing or detoxifying organic pollutants from a fluid by contacting the fluid with a photoreactive semiconductor material in the presence of ultraviolet light of a wavelength in the range of 300 to 425 nm to activate the photoreactive material, whereby to generate superoxide ions formed by electron transfer from the conducting band of the semiconductor material to molecular oxygen to furnish electrons for recombination with holes in the semiconductor material, the improvement comprising inhibiting such recombination by simultaneously contacting the photoreactive material with at least one of additional ions selected from bromate ions, chlorate ions, perchlorate ions, permanganate ions, ferrate ions and peroxyacetic acid whereby said additional ions irreversibly accept electrons either from the conduction band of the semiconductor material or from the superoxide ions and dissociate leaving the photogenerated holes to efficiently enhance the removal, reduction or detoxification of said organic pollutants.

18. A method according to claim 17, wherein the light has a wavelength in the range of 340 to 360 nm.

19. A method according to claim 17, wherein the fluid is water.

20. A method according to claim 17, wherein the photoreactive material is $TiO_2$.

* * * * *